Figure 1:
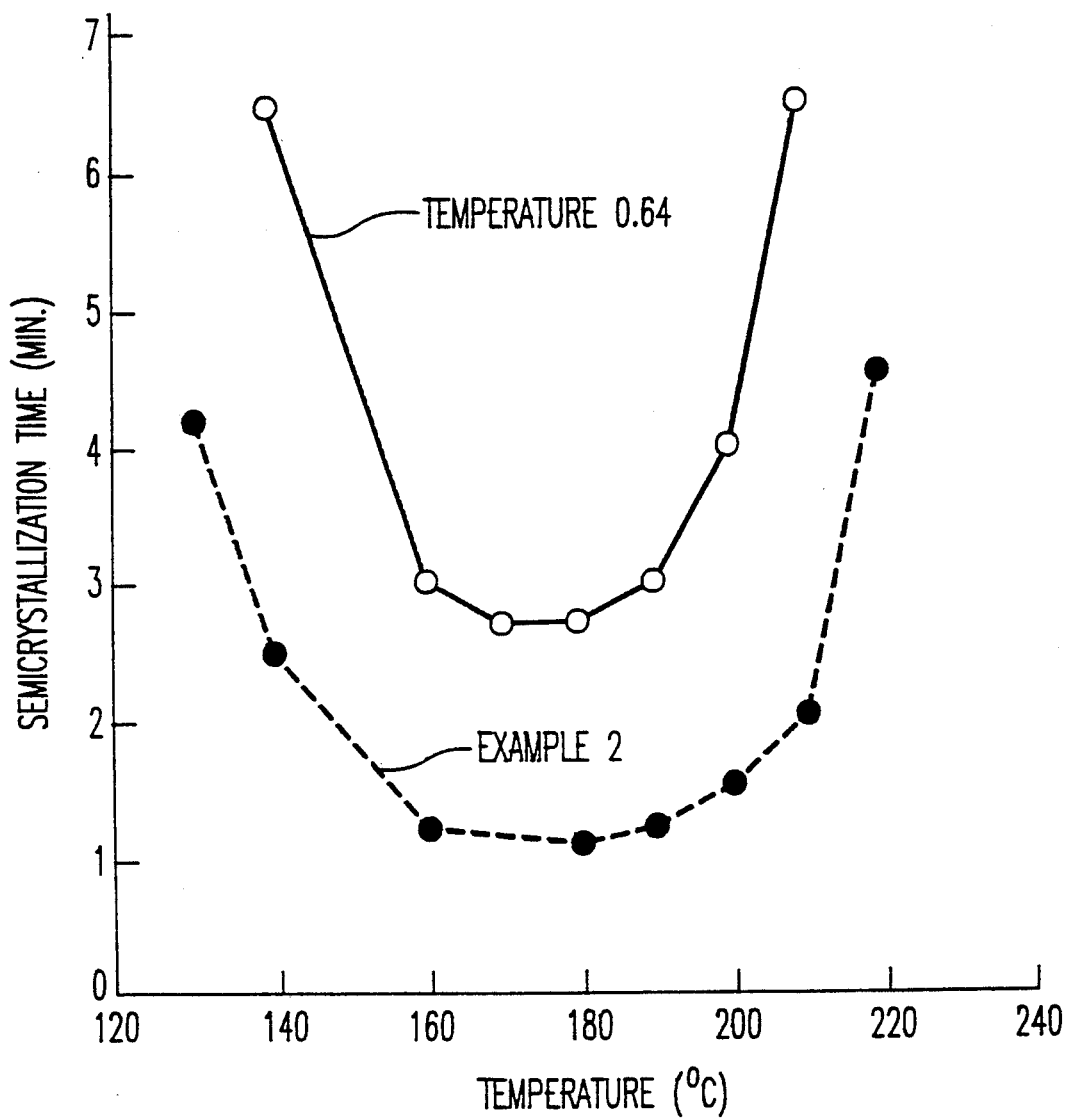

United States Patent [19]

Pó et al.

[11] Patent Number: 5,278,281
[45] Date of Patent: Jan. 11, 1994

[54] POLYESTERS SHOWING A HIGH CRYSTALLIZATION RATE AND PROCEDURE FOR THEIR PREPARATION

[75] Inventors: Riccardo Pó; Ernesto Occhiello; Fabio Garbassi, all of Novara; Luigi Pelosini, Fontaneto d'Agogna, all of Italy

[73] Assignee: Enichem S.P.A., Milan, Italy

[21] Appl. No.: 850,039

[22] Filed: Mar. 12, 1992

[30] Foreign Application Priority Data

Mar. 18, 1991 [IT] Italy ............................. 000713 A/91

[51] Int. Cl.$^5$ ............................................. C08G 63/16
[52] U.S. Cl. .................................... 528/302; 528/272; 528/308; 528/308.3; 528/308.6; 525/437; 525/444
[58] Field of Search ................ 525/437, 444; 528/272, 528/302, 308, 308.6, 308.3

[56] References Cited

PUBLICATIONS

CA 110 (22):193718m.
CA 108 (16):132569a.
CA 106 (2):5790z.
Patent Abstracts of Japan, vol. 5, No. 180(C-79)852τ, Nov. 19, 1981, & JP-A-56-104933, Aug. 21, 1981, M. Yoshifumi, et al., "Preparation of Quick-Crystallizable Polyester".
Makromol. Chem., vol. 186, No. 8, Aug. 1985, pp. 1575-1591, A. Y. Bilibin, et al., "Thermotropic Polyesters, 2. Synthesis of Regular Polyesters from Aromatic Dicarboxylic Acids and Phenols or Aliphatic Diols, and Study of Their Mesomorphic Properties".
Mol. Cryst. Liq. Cryst., vol. 193, Nov./Dec. 1990, pp. 199-204, E. Hempel, et al., "From Conventional to Liquid Crystalline Polyesters".

Primary Examiner—John Kight, III
Attorney, Agent, or Firm—Oblon, Spivak, McClelland, Maier & Neustadt

[57] ABSTRACT

Polyesters with a high crystallization rate synthesized by the polycondensation of terephthalic acid with at least one $C_2$-$C_4$ alkylenic glycol in the presence of 0.1-1.5 mol % of a copolymerizable reagent having the general formula:

$$ROOC-Ar-OOC-Ar'-COO-Ar-COOR$$

where Ar and Ar' represent aromatic radicals and R represent a halogen, a hydrogen atom or a $C_1$-$C_4$ alkyl radical.

9 Claims, 1 Drawing Sheet

POLYESTERS SHOWING A HIGH CRYSTALLIZATION RATE AND PROCEDURE FOR THEIR PREPARATION

The present invention relates to polyesters with a high crystallization rate and the procedure for their preparation.

More specifically, the present invention relates to polyesters with a high crystallization rate, the procedure for their preparation and their use in the preparation of moulded shaped articles obtained by means of normal transformation techniques of thermoplastic polymers.

It is well-known that polyester resins, such as polyethyleneterephthalate (PET), have good physical and chemical characteristics which make them particularly suitable for the preparation of fibres, films, cable holders, moulded products, etc.

It is also known that their behaviour on crystallization influences many of the above applications and presents obvious defects. It is sufficient to remember, for example, that when PET is injected, long moulding cycles are required due to the slow crystallization rate.

Numerous methods are cited in the art for increasing the crystallization rate of polyester resins. One of these, described in European Patent Application publication 258.636 or in U.S. Pat. No. 4.486.561, discloses the use of the salts of weak acids, such as carboxylic acids, and the salts of phenols, as additives. This kind of modification is usually defined as chemical nucleation and its operating mechanism is described in an article by J. P. Mercier in Polymer Engineering and Science, Vol. 30, 1990, pages 270-278.

Another method referred to in literature for improving the crystallization kinetics of polyester resins is mixing with other polymers, for example HDPE (European Patent Application publication 104.131), polyamides (European Patent Application publication 303.234), polyesteramides (Patent Application publication 143.953) or crystalline liquid polyesters (Japanese Patent Application publication 89/170.-646). Another method consists of mixing with organic compounds such as phthalimides (U.S. Pat. No. 4.639.480), acetals, amides, nitriles, sulphones and sulpohoxides (German Patent Application publication 3.532.033).

All these methods however require mixing with additives which means that the polymer resulting from the synthesis should undergo a thermal cycle, with the consequent effects of degradation.

This problem is particularly evident in the chemical nucleation of polyethyleneterephthalate with the salts of weak acids and of phenols which cause considerable degradation of PET. In this case it is necessary to use reactive compounds towards the terminal groups, such as epoxy resins, to limit the reduction in the molecular weight of the polymer.

It has now been found by the Applicant that the drawbacks in the known art, relating to the crystallization kinetics of polyester resins, can be overcome by using small molar quantities of a specific reagent in the polymerization mixture which allows the polymer to crystallize very rapidly (intrinsic crystallization) without the use of particular additives.

The present invention consequently relates to polyesters with a high crystallization rate obtained by the polycondensation of at least one $C_2$–$C_4$ alkylenic glycol with a mixture composed of terephthalic acid, possibly substituted with halogens, such as chlorine, or with $C_1$–$C_4$ alkyl radicals, or one of its derivatives, and of 0.1-1.5% in moles of the total of a copolymerizable reagent having the general formula:

$$\text{ROOC--Ar--OOC--Ar'--COO--Ar--COOR} \qquad (I)$$

where Ar and Ar', either the same or different, represent aromatic radicals containing from 6 to 20 carbon atoms whereas R represents a halogen such as chlorine, a hydrogen atom, or a $C_1$–$C_4$ alkyl radical.

Preferred polyesters in accordance with the present invention are those obtained in the presence of 0.5-1% in moles of the reagent having general formula (I).

Preferred reagents having general formula (I) are those wherein R represents a hydrogen atom or a methyl or ethyl radical and wherein Ar and Ar' are selected from or naphthalene rings, in particular naphthalene rings having reactive functions in positions (1,2), (1,3), (1,6), (2,3), (2,6), (2,7).

Examples of alkylenic glycols particularly suitable for the present invention are ethylene glycol and butylene glycol.

The compounds corresponding to general formula (I) are well-known products whose preparation is described in Chemical Abstracts, vol. 99, no. 218533, 1983 and Chemical Abstracts, vol. 97, no. 72969, 1982.

Polyesters with a high crystallization rate subject of the present invention have an inherent viscosity, measured in phenol/tetrachloroethane (60/40 by weight) at 30° C. with concentrations of 0.25 g/dl, higher than 0.5 dl/g, generally between 0.6 and 1.5 dl/g, a crystallization temperature which is higher than 170° C., generally between 175° and 200° C., and a glass transition temperature (Tg) higher than 75° C.

In particular, the polyesters basically obtained from terephthalic acid, ethylene glycol and the reagent having formula (I) wherein Ar and Ar' are aromatic radicals having a strongly non-linear symmetry or are sterically hindered radicals (benzene rings with functional groups in position 1,2 and 1,3 or naphthene radicals with functional groups in position 2,3) have a Tg of 80° C., about 5° C. higher than that of traditional PET. This is a surprising result in that it is well-known that the introduction into PET of increasing amounts of asymmetrical units, such as those deriving from isophthalic acid, causes a decrease in both the Tg and crystallization temperature.

The polymers of the present invention are suitable for use in the production of moulded bodies which can be prepared with the conventional transformation technologies of thermoplastic polymers such as, for example, injection moulding or extrusion, they can be processed in the form of either film or fibre, they can be used as matrixes for composite materials based on fibres or inorganic charges and they can be used in the preparation of mixtures with other polymers.

One procedure for the preparation of polyesters with a high crystallization rate, subject of the present invention, is to react at least one $C_2$–$C_4$ alkylenic glycol with a mixture composed of terephthalic acid, possibly substituted, or one of its derivatives, and of 0.1-1.5% in moles of the total of a copolymerizable reagent having the general formula:

$$\text{ROOC--Ar--OOC--Ar'--COO--Ar--COOR}$$

where Ar, Ar' and R have the meaning specified above.

More specifically, the procedure of the present invention can be carried out as described in "Comprehensive Polymer Science", G. C. Eastmond, A. Ledwith, S. Russo, P. Singwalt Eds. Pergamon Press, Oxford 1989, vol. 5, page 275.

In a typical synthesis procedure starting from diester of bicarboxylic acid, the reaction mixture is degassed, put in an inert atmosphere (nitrogen) and heated to 180° C., the distillation temperature of the alcohol released in the alcoholysis reaction. The temperature is then gradually increased to 280°–290° C. and the pressure reduced to 0.1–0.2 Torr. to favour polycondensation.

The reactions which occur during the above syntheses are catalyzed by compounds of an acid nature, for example protic acids such as $H_2SO_4$ or Lewis acids such as manganese acetate, zinc acetate, etc. In the polycondensation phase it is convenient to use acid oxides such as those of antimony and germanium or the alcoholates of transition metals such as titanium tetraisopropoxide. In the present procedure it is preferable to use tetrahydrated manganese acetate and antimony oxide, as this catalytic system is less active in the decomposition catalysis of the polymer at high temperatures.

The importance of the present invention is therefore evident to experts in the art. The possibility of producing an intrinsic increase in the crystallization kinetics avoids the necessity of resorting to nucleants, especially the salts of weak acids, which cause considerable degradation, which are extended in each recycling operation of the material and produce additional costs. Moreover, an increase in the glass transition temperatures, for example in the case of PET, can provide greater compatability of the polymer with typical tecnologies of the packaging industry, such as heat filling.

The examples which follow provide an illustration of the present invention but do not limit it in any way.

EXAMPLE 1

This example describes the preparation of a polyester from dimethyl terephthalate, dimethyl 4,4'-(terephthaloyldioxy) dibenzoate and ethylene glycol.

153.6 g of dimethyl, terephthalate, 3.47 g of dimethyl 4,4'-(terephthaloyldioxy)dibenzoate, 110.1 g of ethylene glycol and 150 mg of manganese acetate tetrahydrate were charged into a 500 ml glass flask under an inert atmosphere. The reaction mixture was brought to 180° C. and kept at this temperature for 90 minutes to distill the methanol. The temperature was then brought to 210° C. and 70 mg of antimony trioxide and 450 mg of 2,6-di-tert-butyl-4-methylphenol were added. After increasing the temperature to 240° C., the pressure was slowly reduced to 0.1 Torr and the temperature raised to 290° C., these conditions being maintained for 30 minutes; during this period, the excess ethylene glycol was removed. After bringing the apparatus back to room temperature and atmospheric pressure with $N_2$, the polymer obtained had an inherent viscosity, measured in phenol/tetrachlorethane (60/40 by weight) of 0.73 dl/g.

Its glass transition temperature, obtained by using a thermal scanning calorimeter (DSC), is shown in Table 1 where it is compared to that of a PET having a viscosity of 0.64 produced by the company Montefibre of Milan.

Table 2 indicates the temperature corresponding to the minimum hexothermal crystallization peak, hereafter referred to as Tc. This temperature was obtained by means of DSC, by bringing the sample to above melting point and subsequently carrying out a temperature scanning towards the lower temperatures. It will be evident to experts in the art that the higher the above temperature, the more rapid will be the appearance of crystals and consequently the crystallization of the polyester. Also in this case, a PET with a viscosity of 0.64 produced by Montefibre in Milan was used as a comparison.

EXAMPLE 2

The procedure described in Example 1 was repeated using, however, dimethyl 4,4'-(isophthaloyldioxy)-dibenzoate.

153.6 g of dimethyl terephthalate, 3.47 g of dimethyl 4,4'-(isophthaloyldioxy)dibenzoate, 110.0 g of ethylene glycol, 150 mg of manganese acetate tetrahydrate and 20 mg of cobalt acetate tetrahydrate were polymerized. 70 mg of antimony trioxide and 450 mg of 2,6-di-tert-butyl-4-methylphenol were added at a temperature of 230° C.

The resulting polymer had an inherent viscosity of 0.66 dl/g. The Tg and Tc data are shown in Tables 1 and 2. It can be noted that, in spite of the addition of a non-symmetrical comonomer, there is a considerable increase in the Tg and Tc also with respect to the data relating to Example 1.

EXAMPLE 3

The procedure described in Example 2 was repeated, using a lower molar percentage of dimethyl 4,4'-(isophthaloyldioxy) dibenzoate.

96.5 g of dimethyl terephthalate, 1.08 g of dimethyl 4,4'-(isophthaloyldioxy)dibenzoate, 68.2 g of ethylene glycol and 100 mg of manganese acetate tetrahydrate were reacted. 45 mg of antimony trioxide and 300 mg of 2,6-di-tert-butyl-4-methoxyphenol added at a temperature of 200° C.

The resulting polymer had an inherent viscosity of 0.76 dl/g. The Tg and Tc data are shown in Tables 1 and 2. It can be noted that, in spite of the addition of asymmetrical monomers, there is a considerable increase in the Tg and Tc, also with respect to the data relating to Example 1.

EXAMPLE 4

The procedure described in Example 2 was repeated using a higher molar percentage of dimethyl 4,4'-(isophthaloyldioxy) dibenzoate.

95.1 g of dimethyl terephthalate, 4.34 g of dimethyl 4,4'-(isophthaloyldioxy)dibenzoate, 68.2 g of ethylene glycol and 100 mg of manganese acetate tetrahydrate were reacted. 45 mg of antimony trioxide and 250 mg of 2,6-di-tert-butyl-4-methoxyphenol were added at a temperature of 200° C.

The resulting polymer had an inherent viscosity of 0.75 dl/g. The Tg and Tc data are shown in Tables 1 and 2. It can be noted that, even though monomers with a non-linear symmetrical substitution have been introduced, there is a considerable increase in the Tg and Tc, also with respect to the data relating to Example 1.

EXAMPLE 5

The procedure described in Example 1 was repeated, using dimethyl 3,3'-(terephthaloyldioxy)di-2,2'-naphthoate.

119.1 g of dimethyl terephthalate, 3.31 g of dimethyl 3,3'-(terephthaloyldioxy)di-2,2-naphthoate, 84.7 g of ethylene glycol and 124 mg of manganese acetate tetrahydrate were polymerized. 56 mg of antimony trioxide and 370 mg of 2,6-di-tert-butyl-4-methylphenol were added at a temperature of 200° C.

The resulting polymer had an inherent viscosity of 0.72 dl/g. The Tg and Tc data are shown in Tables 1 and 2. It can be noted that even though monomers with strongly hindered ester groups were introduced, there is a considerable increase in the Tg and Tc, also with respect to the data relating to Example 1.

EXAMPLE 6

Crystallization kinetics were obtained on the comparison PET and on one of the polyesters of the present invention, i.e. that referred to in Example 2. These were derived from DSC measurements, with the following procedure:

- the sample was heated to 280° C. and kept at melting temperature for 2 minutes, in order to destroy all crystalline centres;
- the temperature was rapidly decreased (150° C./minute) to the required value;
- keeping the temperature constant, the values of the thermal exchange with relation to the time were registered;
- the semicrystallization time was considered as that corresponding to an area equal to half of the hexothermal crystallization peak.

FIG. 1 shows the semicrystallization times with relation to the temperature of the PET used as a reference and the polyester whose synthesis is described in Example 2. In this latter case, there is a drastic reduction in the semicrystallization times, corresponding to a considerable increase in the crystallization rate. There is also a wider temperature range at which rapid crystallization occurs, with corresponding advantages during the moulding.

TABLE 1

| Sample | Tg (°C.) |
| --- | --- |
| PET (comparison) | 75 |
| Example 1 | 80 |
| Example 2 | 81 |
| Example 3 | 78 |
| Example 4 | 78 |
| Example 5 | 81 |

TABLE 2

| Sample | Tg (°C.) |
| --- | --- |
| PET (comparison) | 177 |
| Example 1 | 188 |
| Example 2 | 195 |
| Example 3 | 182 |
| Example 4 | 179 |

TABLE 2-continued

| Sample | Tg (°C.) |
| --- | --- |
| Example 5 | 196 |

We claim:

1. Polyesters with a high crystallization rate obtained by the polycondensation of at least one $C_2$-$C_4$ alkylenic glycol with a mixture composed of terephthalic acid, optionally substituted with halogens or with $C_1$-$C_4$ alkyl radicals, or one of its derivatives, and of 0.1–1.5% in moles of the total of a reagent having the general formula:

$$\text{ROOC—Ar—OOC—Ar'—COO—Ar—COOR} \quad \text{(I)}$$

where Ar and Ar', either the same or different, represent aromatic radicals containing from 6 to 20 carbon atoms, and R represents a halogen, a hydrogen atom, or a $C_1$-$C_4$ alkyl radical.

2. Polyesters in accordance with claim 1 obtained in the presence of 0.5–1% in moles of the reagent having general formula (I).

3. Polyesters in accordance with claims 1 or 2, wherein the reagents having general formula (I) are those where R represents a hydrogen atom or a methyl or ethyl radical and where Ar and Ar' are selected from benzene or naphthalene rings having the reactive functions in positions (1,2), (1,3), (1,6), (2,3), (2,6), (2,7).

4. Polyesters in accordance with claims 1 or 2, wherein the alkylenic glycols are ethylene glycol or butylene glycol.

5. Polyesters in accordance with claims 1 or 2, having an inherent viscosity, measured in phenol/tetrachloroethane (60/40 by weight) at 30° C. with concentrations of 0.25 g/dl, higher than 0.5 dl/g, a crystallization temperature higher than 170° C., and glass transition temperature (Tg) higher than 75° C.

6. Process for improving the crystallization rate of polyesters, comprising reacting at least one $C_2$-$C_6$ alkylenic glycol with a mixture composed of at least one bicarboxylic aromatic acid with a linear symmetry, or one of its derivatives, and of 0.1–1.5% in moles of the total of a reagent having the general formula:

$$\text{ROOC—Ar—OOC—Ar'—COO—Ar—COOR}$$

where Ar, Ar', either the same or different, represent aromatic radicals containing from 6 to 20 carbon atoms, and R represents a halogen, a hydrogen atom or a $C_1$-$C_4$ alkyl radical.

7. Process for the preparation of molded products, comprising molding the polyesters of claims 1 or 2.

8. Process according to claim 7, wherein the molding is by extrusion or injection molding.

9. Polyesters according to claim 5, having an inherent viscosity between 0.6 and 1.5 dl/g, and a crystallization temperature between 175° to 200° C.

* * * * *